(12) United States Patent
Liao

(10) Patent No.: US 7,964,999 B2
(45) Date of Patent: Jun. 21, 2011

(54) VOICE COIL MOTOR MODULE

(75) Inventor: Chia-Hung Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 84 days.

(21) Appl. No.: 12/495,788

(22) Filed: Jun. 30, 2009

(65) Prior Publication Data

US 2010/0277008 A1    Nov. 4, 2010

(30) Foreign Application Priority Data

Apr. 29, 2009    (CN) .......................... 2009 1 0301957

(51) Int. Cl.
*H02K 41/03*    (2006.01)

(52) U.S. Cl. ...................................... 310/12.16; 310/89

(58) Field of Classification Search ............... 310/12.16, 310/89, 88, 40 MM
See application file for complete search history.

(56) References Cited

U.S. PATENT DOCUMENTS

| | | | | |
|---|---|---|---|---|
| 4,798,984 A * | 1/1989 | Suzuki et al. | ............... | 310/68 C |
| 6,700,254 B2 * | 3/2004 | Wong | ............... | 310/89 |
| 6,881,077 B2 * | 4/2005 | Throum | ............... | 439/76.1 |
| 7,098,564 B2 * | 8/2006 | Gehring et al. | ............... | 310/154.08 |
| 7,405,892 B2 * | 7/2008 | Wu et al. | ............... | 359/824 |

* cited by examiner

*Primary Examiner* — Nguyen N Hanh
(74) *Attorney, Agent, or Firm* — Raymond J. Chew

(57) ABSTRACT

A shell for housing a voice coil motor (VCM) includes a casing and a cover. The casing defines a rectangular opening and two opening respectively in two opposite edges of the rectangular opening. The casing extends a pair of stripping strips into each opening and towards each other. The cover correspondingly defines two grooves. The cover covers the rectangular opening and each pair of gripping strip is bent into a corresponding groove to grip the cover.

15 Claims, 2 Drawing Sheets

VOICE COIL MOTOR MODULE

BACKGROUND

1. Technical Field

The present disclosure relates to motor modules and, particularly, to a voice coil motor (VCM) module.

2. Description of Related Art

VCMs are now widely used in camera modules for driving the camera modules to focus. To shield the VCMs from being interfered by external electromagnetic fields, metal shells are employed. Such a shell typically includes a casing and a cover. The casing defines an opening. In assembly, a VCM is housed by the casing by inserting the VCM into the casing via the opening. Then, the opening is covered by the cover using curable adhesive. Thereby, the VCM is enclosed in the shell. However, combining strength provided by the curable adhesive is low. Therefore, the casing and the cover may easily separate from each other upon impact with other objects.

Therefore, it is desirable to provide a VCM module, which can overcome the above-mentioned problems.

DETAILED DESCRIPTION

Figure 1:
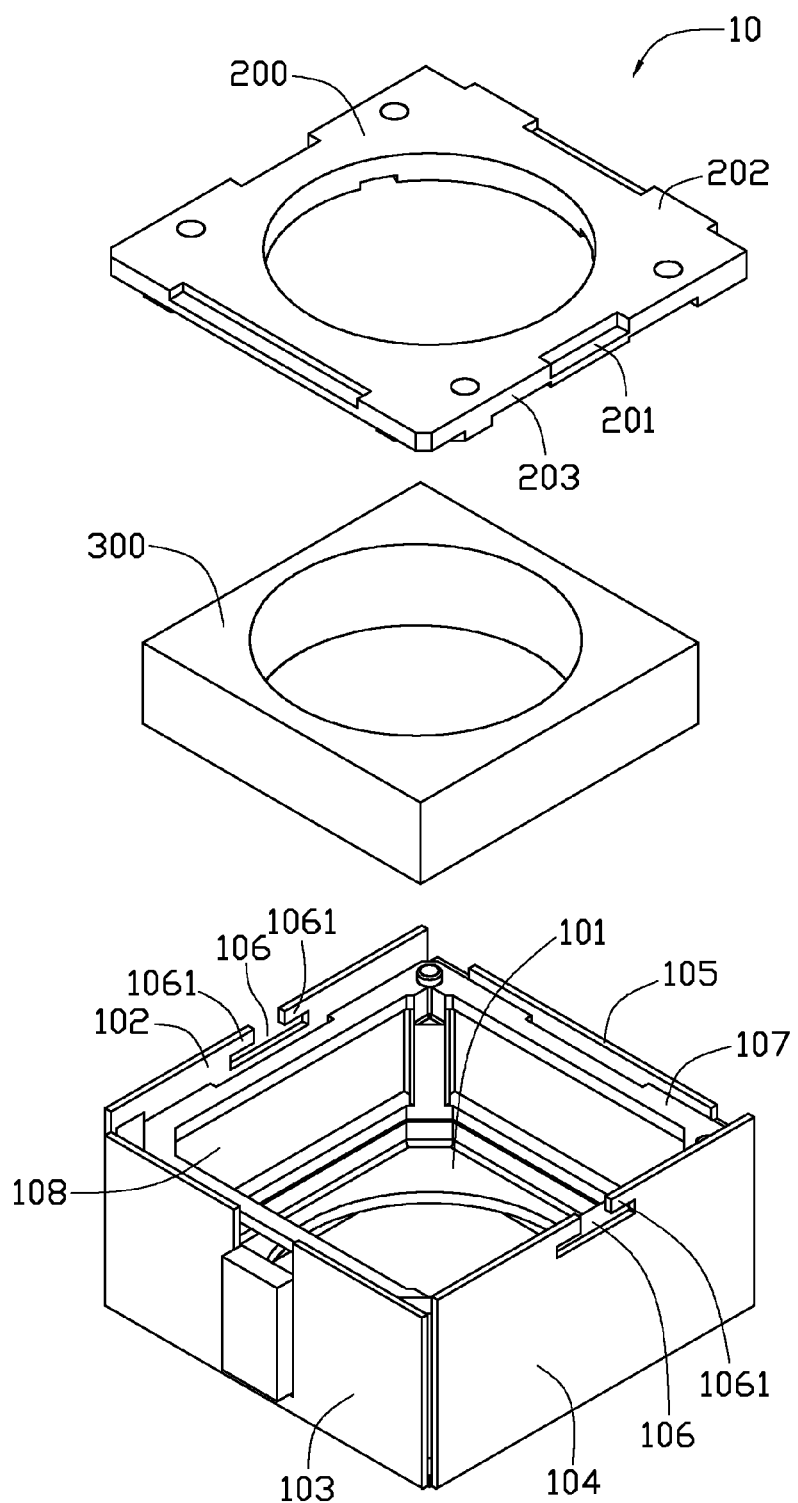
FIG. 1 is an isometric, exploded, schematic view of a shell for housing a VCM, according to an exemplary embodiment.

Referring to FIG. 1, a shell 10 for housing a VCM 300, according to an exemplary embodiment, is disclosed. The shell 10 includes a casing 100 and a cover 200.

The casing 10 includes a rectangular plate 101 and four sidewalls 102, 103, 104, 105. The four sidewall 102, 103, 104, 105 perpendicularly extend upwards from a corresponding edge of the rectangular plate 101. In this embodiment, the rectangular plate 101 and the four sidewalls 102, 103, 104, 105 are integrally formed. The rectangular plate 101 and the four sidewalls 102, 103, 104, 105 corporately define a receiving space 108 for accommodating the VCM 300. The four sidewalls 102, 103, 104, 105 form a rectangular opening 107 at an end thereof away from the rectangular plate 101.

Each of the two opposite sidewalls 102, 104 defines a T-shaped opening 106 therein generally at the middle of an edge thereof away from the rectangular plate 101 (i.e., the edge of the rectangular opening 107). In particular, the T-shaped openings 106 can be formed by, for example, punching. Accordingly, each of the opposite sidewalls 102, 104 forms a pair of gripping strips 1061. The length of the gripping strips 1061 is substantially parallel to the rectangular plate 101.

The cover 200 is shaped and sized corresponding to the rectangular opening 107 so as to fittingly engage with the rectangular opening 107 (similar to the rectangular plate 101 in shape but slightly smaller than the rectangular plate 101 in size). The cover 200 includes an outer surface 202 and a side surface 203 connecting the outer surface 202. The cover 200 defines two grooves 201 in an intersection portion between the outer surface 202 and the side surface 203 generally at two opposite edges of the outer surface 202. The grooves 201 are step-shaped.

Figure 2:
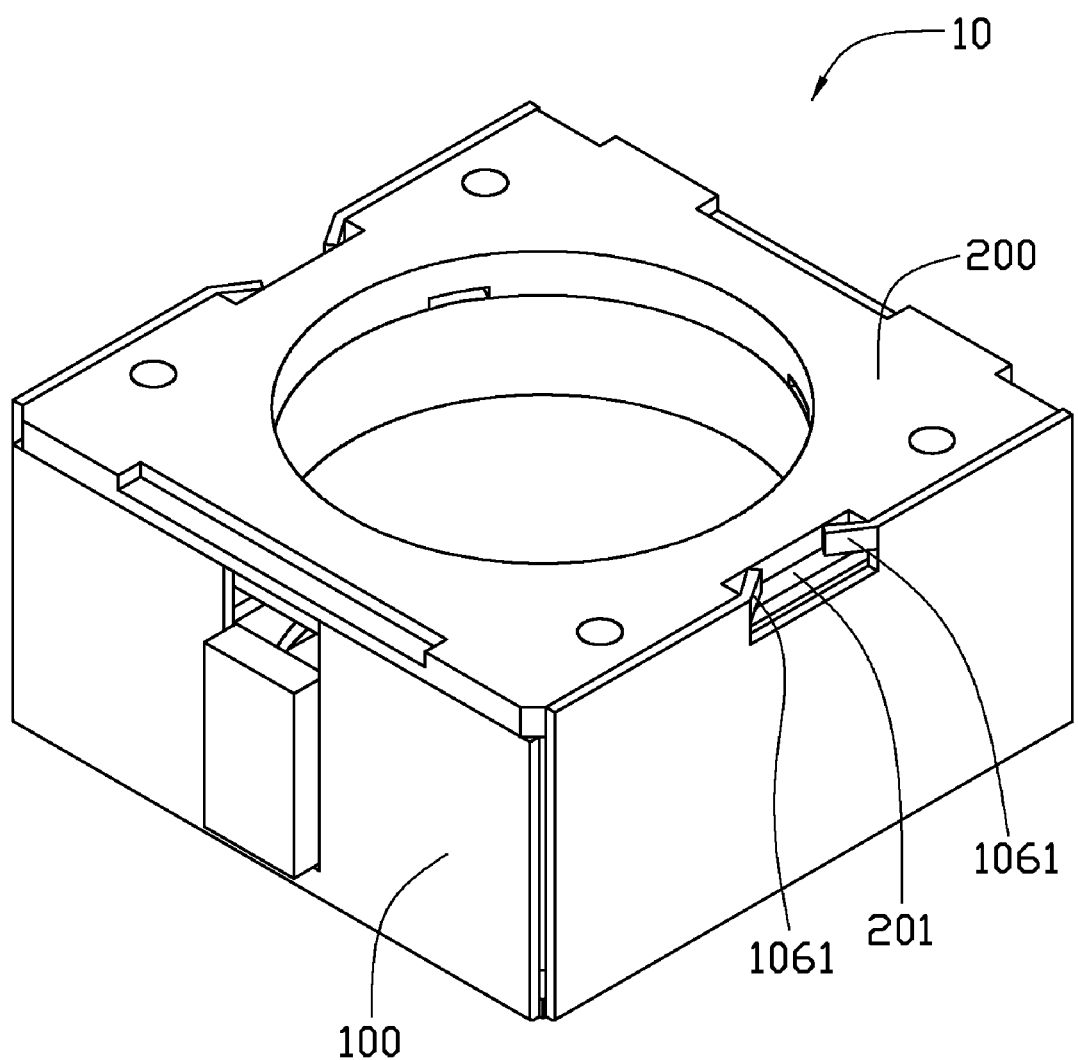
FIG. 2 is an isometric, assembled, schematic of the shell of FIG. 1.

Referring to FIG. 2, in assembly, the VCM 300 is housed by the casing 100. Then the cover 200 covers the rectangular opening 107 in a manner that each pair of gripping strips 1061 faces a corresponding groove 201. Then, each pair of gripping strips 1061 is bent into the corresponding groove 201 to grip the cover 200.

For this embodiment, the cover 200 is secured to the casing 100 using the gripping strips 1061. Combining strength between the casing and the cover 200 is improved, as compared with those using curable adhesive.

It should be understood that the number of the T-shaped openings 106 in each of the sidewalls 102, 104 is not limited to one but could be more, if needed. In addition, the sidewalls 103, 105 can define the T-shaped openings 106 too, if needed. Further, it should be mentioned that the T-shaped openings 106 are not limited to this embodiment, any other opening forming with the pair of gripping strips 1061 can be adapted instead of the T-shaped openings 106 in other alternative embodiments.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A voice coil motor module comprising:
   a shell for housing a voice coil motor, comprising:
      a casing comprising:
         a rectangular plate; and
         four sidewalls perpendicularly extending upwards from the four edges of the rectangular plate; two opposite sidewalls each defining an opening in an end thereof away from the rectangular plate and having a pair of gripping strips extending towards each other and extending into the opening along directions substantially parallel to the rectangular plate; and
      a cover similar to the rectangular plate in shape but smaller than the rectangular plate in size, the cover comprising an outer surface and a side surface connecting the outer surface, the cover defining two grooves in an intersection between the outer surface and the side surface generally at two opposite edges of the outer surface, the cover being placed on the four sidewalls and each pair of gripping strips being bent into a corresponding groove to grip the cover; and
   a voice coil motor housed by the shell.

2. The voice coil motor module of claim 1, wherein the rectangular plate and the sidewalls are integrally formed.

3. The voice coil motor module of claim 1, wherein the other opposite sidewalls each define an opening in an end thereof adjacent to the cover.

4. The voice coil motor module of claim 1, wherein the openings are generally T-shaped.

5. A voice coil motor module comprising:
   a shell comprising:
      a casing including a rectangular opening, and two T-shaped openings respectively in two opposite edges of the rectangular opening, thereby forming a pair of gripping strips extending into each T-shaped opening and towards each other, and
      a cover engaged in the rectangular opening and defining two grooves corresponding to the pairs of gripping strips, each gripping strip being bent into a corresponding groove to grip the cover; and
   a voice coil motor housed by the shell.

6. The voice coil motor module of claim 5, wherein the casing comprises a rectangular plate and four sidewalls perpendicularly extending upwards from the four edges of the rectangular plate, and the four sidewalls form the rectangular opening at an end thereof away from the rectangular plate.

7. The voice coil motor module of claim 6, wherein the cover is similar to the rectangular plate in shape but smaller than the rectangular plate in size, the cover comprises an outer surface and a side surface connecting the outer surface, and the two groove are defined in an intersection between the outer surface and the side surface generally at two opposite edges of the outer surface.

8. The voice coil motor module of claim 7, wherein the two T-shaped openings are defined in the two opposite sidewalls.

9. The voice coil motor module of claim 8, wherein each of the gripping strips is substantially parallel to the rectangular plate.

10. The voice coil motor module of claim 9, wherein the other opposite sidewalls each define an opening in an end thereof adjacent to the cover.

11. A voice coil motor module comprising:
a shell comprising:
  a casing comprising:
    a rectangular plate, and
    four sidewalls perpendicularly extending upwards from the four edges of the rectangular plate, the four sidewalls forming a rectangular opening at an end thereof away from the rectangular plate, two opposite sidewalls each defining an opening in an end thereof away from the rectangular plate and having a pair of gripping strips extending towards each other and into the opening along directions substantially parallel to the rectangular plate; and
  a cover engaged in the rectangular opening and defining two grooves corresponding to the pairs of gripping strips, each gripping strip being bent into a corresponding groove to grip the cover; and
a voice coil motor housed by the shell.

12. The voice coil motor module of claim 11, wherein the openings of the two opposite sidewalls are generally T-shaped.

13. The voice coil motor module of claim 12, wherein the cover is similar to the rectangular plate in shape but smaller than the rectangular plate in size, the cover comprises an outer surface and a side surface connecting the outer surface, and the two grooves are defined in an intersection between the outer surface and the side surface generally at two opposite edges of the outer surface.

14. The voice coil motor module of claim 13, wherein the rectangular plate and the sidewalls are integrally formed.

15. The voice coil motor module of claim 14, wherein the other opposite sidewalls each define an opening in an end thereof adjacent to the cover.

\* \* \* \* \*